United States Patent [19]

Washino

[11] Patent Number: 5,450,140
[45] Date of Patent: Sep. 12, 1995

[54] PERSONAL-COMPUTER-BASED VIDEO PRODUCTION SYSTEM

[76] Inventor: Kinya Washino, 80 Hamilton Ave., Dumont, N.J. 07624

[21] Appl. No.: 50,861

[22] Filed: Apr. 21, 1993

[51] Int. Cl.6 .................................... H04N 5/232
[52] U.S. Cl. .................................. 348/722; 348/211; 348/212; 348/213; 348/552
[58] Field of Search ............... 348/61, 211, 212, 213, 348/159, 722, 552; H04N 5/232

[56] References Cited

U.S. PATENT DOCUMENTS

| | | | |
|---|---|---|---|
| 4,148,069 | 4/1979 | Smiley et al. | 348/722 |
| 4,198,656 | 4/1980 | Mathisen | 348/159 |
| 4,205,346 | 5/1980 | Ross | 348/722 |
| 4,477,896 | 10/1984 | Aker | 370/24 |
| 4,516,156 | 5/1985 | Fabris et al. | 340/712 |
| 4,907,085 | 3/1990 | Bingham | 348/722 |
| 4,949,169 | 8/1990 | Lumelsky et al. | 340/717 |
| 5,079,634 | 1/1992 | Hosono | 348/212 |
| 5,128,770 | 7/1992 | Inana et al. | 354/293 |
| 5,206,732 | 4/1993 | Hudson | 348/211 |

OTHER PUBLICATIONS

Future Productions, Inc. "Breakthrough in Video Production and Duplication".
3-Chip CCD Studio/OB Color Camera System BVP-370, BVP-270.
3-Chip CCD Portable Color Camera BVP-70/70P.

Primary Examiner—Howard W. Britton
Attorney, Agent, or Firm—Krass & Young

[57] ABSTRACT

In a multimedia video production control system, equipment supplied by various manufacturers is integrated to allow a consumer to control the equipment and edit a production at a centralized location. An adapter unit, interfaced to each camera and pan/tilt mount unit to be used with the system, feeds a cable which, in turn, connects to a camera interface module containing cable compensation and amplification circuitry so that the signals generated by the various cameras may be combined in a commercially available video switcher unit at a consistent level. In the preferred embodiment, each camera interface unit feeds a computer interface unit, and the computer interface units communicate with a personal computer over a standard interface. The computer interface modules contain time-base correction and frame storage associated with each camera to be used with the system, and accept control signals from the computer, the overall configuration enabling an operator at the computer to control the various cameras and their pan/tilt mounts while viewing individual and program video "signals" in separate windows on the computer monitor as part of a multimedia environment.

11 Claims, 7 Drawing Sheets

PERSONAL-COMPUTER-BASED VIDEO PRODUCTION SYSTEM

FIELD OF THE INVENTION

The present invention relates generally to systems employed to coordinate video cameras and related equipment, and, in particular, to a system which allows video and audio signals from cameras and camcorders of differing designs, as may be supplied by various manufacturers, to be coordinated and edited with the aid of a conventional personal computer incorporating multimedia facilities.

BACKGROUND OF THE INVENTION

Professional quality video production equipment, although increasingly available, remains beyond the financial resources of the average consumer. At the same time, general-purpose computer technology has advanced, and the cost of equipment that is capable of producing many of the most sophisticated video effects and picture manipulations has been reduced so that even average consumers may create video productions of their own. However, while the cost of this kind of equipment is no longer the barrier it once was, there are still technical challenges related to the integration of the various pieces of equipment.

In order to ensure that consumers can properly use the capabilities available, it is necessary to make the interconnection and operation of this equipment sufficiently straightforward that even one with no technical training or experience can achieve satisfactory results. In particular, whenever more than one video source is employed, it is necessary to adjust the timing of the sources so that their electronic signals are in synchronization. The required controls for these adjustments are not provided on consumer cameras, as this type of equipment is generally intended for use in stand-alone systems consisting of a video camera and VCR which may or may not be an integral part of the camera. Currently, no equipment exists which is capable of integrating multiple "live" signals from cameras or camcorders into multimedia-based video production systems. As such, a need remains for a system which provides the necessary facilities to use these cameras and camcorders as part of a far more sophisticated system, one in which professional-type performance is available.

SUMMARY OF THE INVENTION

The present invention provides a multimedia video production control system which integrates equipment supplied by various manufacturers, including video switchers, audio mixers, video display means, motorized pan/tilt camera mounts, including remotely controlled mounts, and video cameras, including remotely controlled cameras and cameras that include a video tape unit. To the equipment desired to be integrated by a user, the present invention adds an adapter unit which is interfaced to each camera to be used with the system, a cable connecting each adapter unit to a separate camera interface module which contains cable compensation and amplification circuitry, and the interface modules in turn feed the video switcher, audio mixer and display means. In the preferred embodiment, the display means is provided as the monitor of a programmed personal computer, and a computer interface module is connected between each camera interface module and the computer, the combination allowing video images generated by the cameras to appear in different windows on the computer monitor and control signals entered at the computer to be routed to the cameras and their pan/tilt mounts so as to control their functioning. The computer interface modules accept the video images, which have been cable-compensated and gain-adjusted within the camera interface modules, and, in turn, perform time-based corrections and frame storage so that the images may be transferred to the computer over a standard interface. The computer interface modules also contain circuitry which accepts control signals from the computer over the standard interface, to allow an operator to select and control individual cameras and their mount positioning, preferably, via control-related icons on the same screen presenting the video images.

In an alternative embodiment, the system does not employ a computer, but instead a separate video monitor is associated with each camera interface unit. Control of the cameras and their pan/tilt mounts is performed at a console upon which the camera interface modules are installed. Regardless of the implementation, control of the cameras and/or mounts may facilitate the use of wireless remote-control units supplied with the cameras or mounts. In such a case, the present invention includes a wireless remote-control receiver located proximate to the console which accepts commands intended for a particular camera or mount, and converts these wireless commands into electrical signals for delivery to the camera or mount via the cable and adapter unit, where they are converted from an electrical signal back into a wireless signal to be received by the remote-control receiver in the respective camera or pan/tilt mount unit.

DETAILED DESCRIPTION OF THE PREFERRED EMBODIMENT

Figure 1:
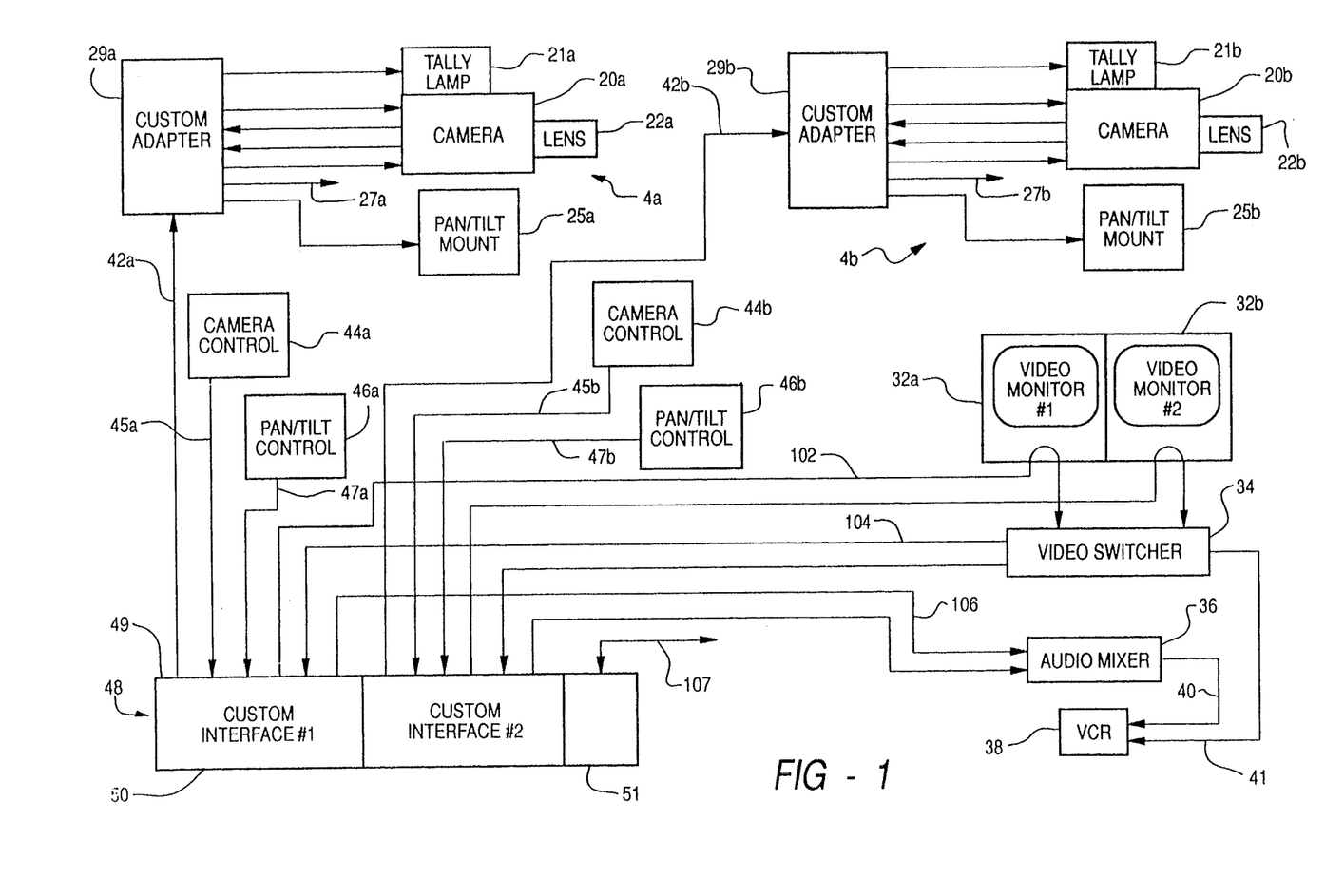
FIG. 1 diagrammatically depicts a preferred embodiment of the present invention in use with two camera systems.

Turning now the figures, FIG. 1 depicts a preferred embodiment of the invention which does not employ PC multimedia equipment. The system employs two cameras, indicated generally at 4a and 4b. While there is no requirement that the cameras be identical models or even that they be made by the same manufacturer, in each case there will be common features, as, for example, a camera 20 equipped with a remote-control zoom lens 22 and a tally-lamp 21, which is illuminated to indicate that the signal from that camera has been selected as the program signal. Additionally, the camera may optionally be mounted on a motorized pan/tilt camera mount 25 which enables the direction and angle of inclination to be remotely controlled by facilities described below. Although it is not a requirement for the functionality of the system, it will be the usual case that the camera contains an integral videotape recorder (or VTR) which will record the video output of the camera as it is operating. The audio and video output signals from the camera are carried to customer adapter 29, through multiple-conductor cable 42, and onward to custom interface 50. This cable also carries the remote control signals from the interface to the camera (lens control, VTR control, etc.) and, if present, the pan/tilt mount. In addition, the cable provides the necessary electrical power to operate all of the equipment, with the custom adapter performing any voltage conversions required for the various pieces of equipment. Provisions for intercom wiring 27 are included in the camera adapter, allowing the program director to guide the actions of the various camera operators during the production. Both cameras have similar facilities, and the two custom interfaces are housed in a single unit 48 which contains the necessary circuitry and power supply, and provides for interconnection of the cameras with the other equipment in the system.

Figure 2:
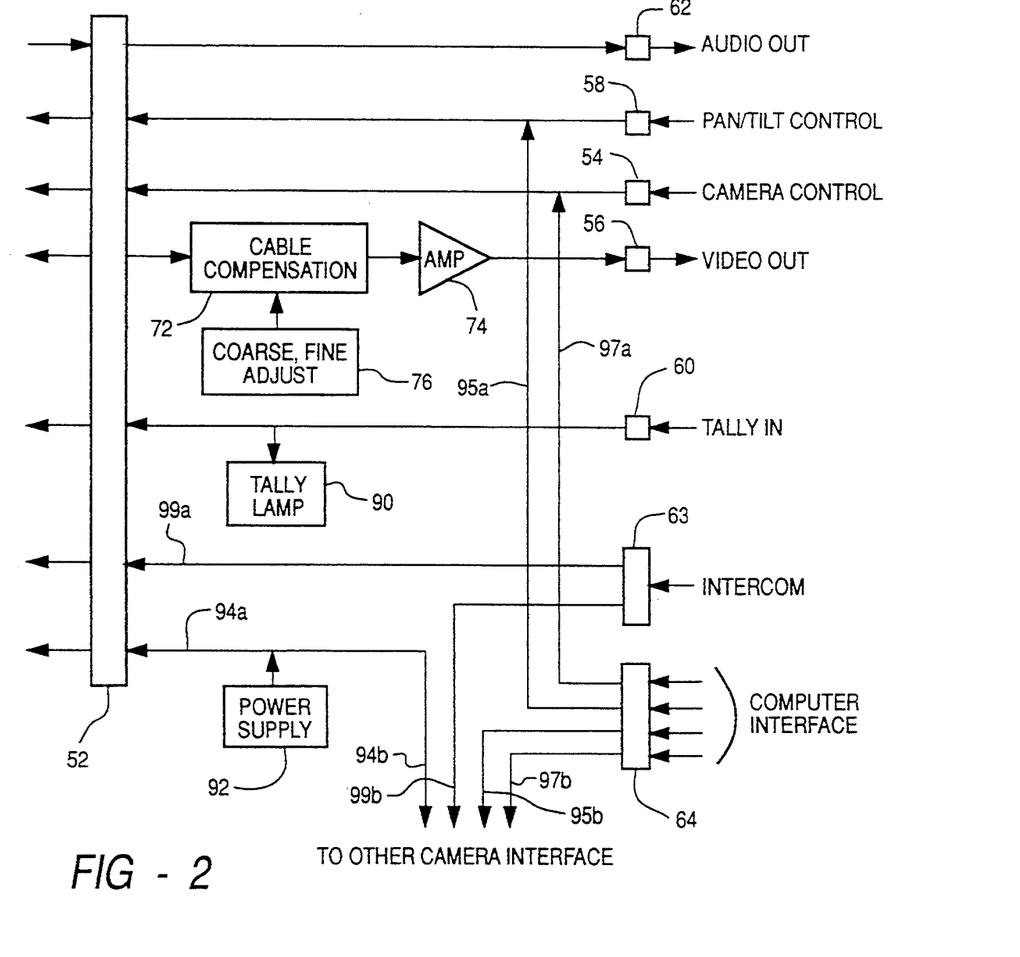
FIG. 2 is a schematic diagram of a two-camera control interface.
Figure 3A:
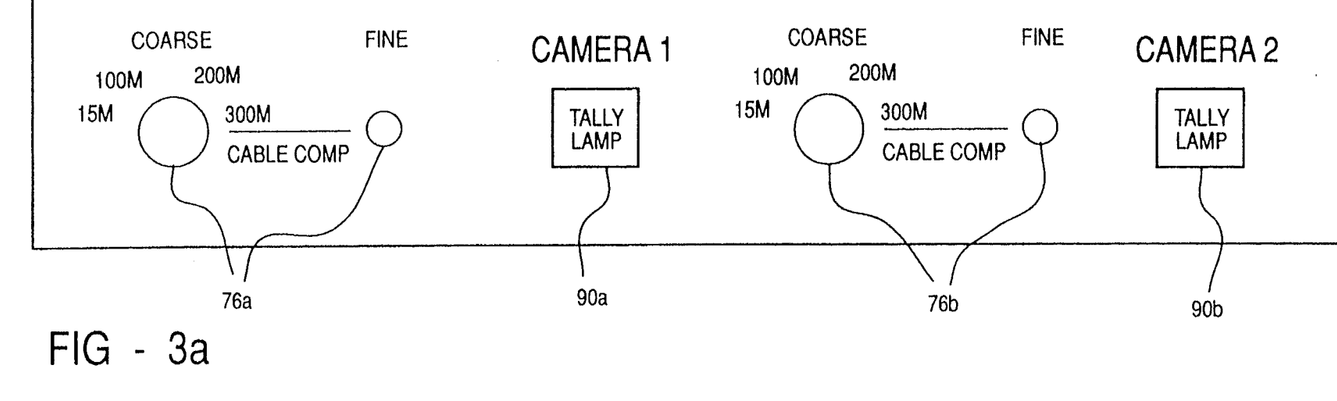
FIGS. 3A and 3B are drawings of the front and rear panel configurations of a two-camera system.
Figure 3B:
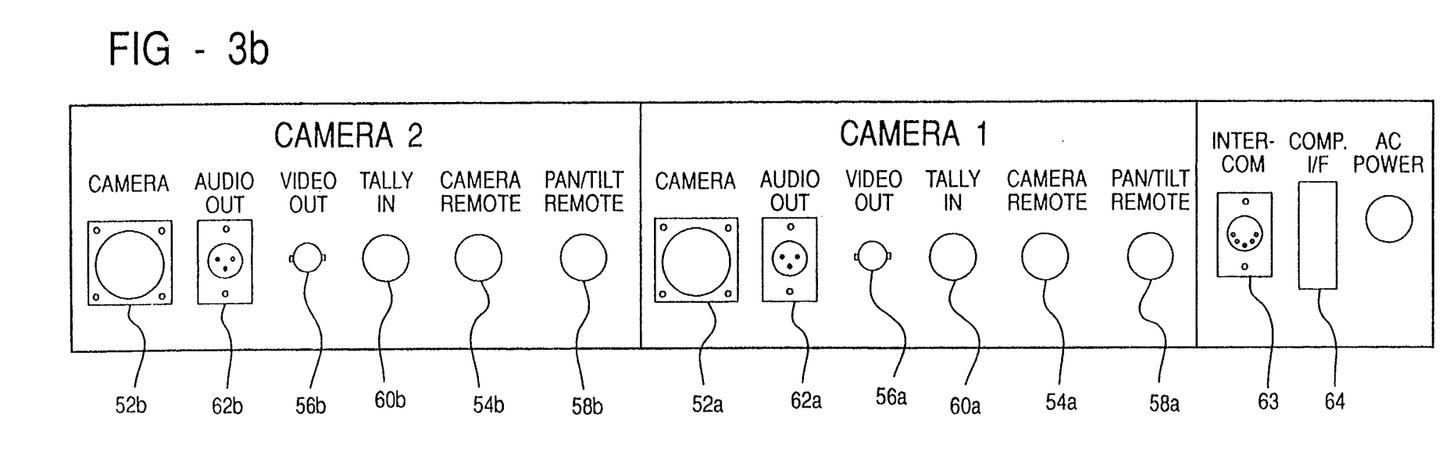

Detailed description of the internal wiring of the custom interface unit 48 is included with reference to FIG. 2. All signals entering or leaving the interface through the various provisions described are through connectors disposed on rear panel 49 of the custom interface. The custom interface has provisions to accept signals from the external Camera Control 44 through cable 45 and connector 54, and the signals from the external pan/tilt mount control 46 travel through cable 47 to connector 58. In addition, "tally lamp" signals from the production switcher 34 enter each interface through connector 60. Camera video is output at connector 56, travels through cable 102 to video monitor 32, and to video switcher 34; tally lamp out signals from the video switcher return to the custom interface through cable 104 and connector 60. Audio signals are output at connector 62, travel through cable 106, and on to audio mixer 36. These audio and video signals are carried to master record VCR 38 through cables 40 and 41, respectively, and the VCR records the program signals. The intercom wiring for the two cameras is made available at custom interface connector 63, for connection to external communication facilities.

In the case of the camera controls 44 and the pan/tilt mount controls 46, it is common for these units to function as "wireless" controllers, relying on infrared transmitters in hand-held units and infrared receivers in the cameras and pan/tilt mount units. To interface these controllers, it is possible either to provide hard-wired connection to infrared transmitter circuitry within the units, or to use an external infrared detector unit which would be affixed directly to the hand-held controller in such a way as to receive the impulses generated by its transmitter. The signals for the remote control units are carried through the input connectors 54 and 58, through the custom interface 50, through the multi-conductor cable 42, and on to the custom adapter 29; for long distances, an amplifier unit would be provided inside the custom adapter. Here, the signal would be fed to an infrared transmitter LED, which would be affixed to the infrared receiver contained in the unit to be controlled. Alternatively, where the units to be controlled already have provisions for accepting remote control signals via a serial data input such as an industry-standard RS-232 or RS-422 interface, the infrared transmitter LEDs attached to the custom adapter would be replaced with appropriate cables and connectors to allow direct connection to the camera or pan/tilt mount.

FIG. 2 shows the internal writing of the custom interface units 50. Some signals, such as the camera audio out and the intercom, are carried directly from the multi-conductor cable connector 52 to individual output connectors 62 and 63, respectively. The camera video output signal is connected to a cable compensation circuit 72 which adjusts for the loss of high-frequency signals accompanying the use of long length cables. Coarse and fine adjustment controls 76, disposed on front panel 51, provide a selector switch for the approximate cable length and a fine control for more exact adjustment. In the preferred embodiment, the actual circuitry would rely upon commercially available transistors and wideband operational amplifiers, such as the MC1496 double-balanced modulator/demodulator. For the coarse adjustment, switched capacitor/resistor/transistor networks adjust the frequency response of the input video signal under control of selector switch 76. For fine control, the double-balanced modulator/demodulator varies the high-frequency response under DC-voltage control. The amplification 74 is performed by a straight-forward transistor output buffer. The internal power supply unit 92 provides DC voltage to both custom interfaces via lines 94. Intercom wires 99 from both interfaces are directed to connector 63 on rear panel 49. A "tally in" lamp 90, indicating when the camera has been selected by the video switcher, is mounted on front panel 51 and is illuminated by a signal provided at input connector 60. Camera control and pan/tilt mount control signals are provided from external controllers through connector 54 and 58, respectively.

In the case of the camera controls, pan/tilt mount controls, and tally-in signal, these may alternatively be provided from an external computer via connector 64. This operation is described in greater detail in the explanations for FIGS. 4–8. The position of the various connectors and controls of the custom interface are shown in front-panel diagram 3a and rear-panel diagram 3b.

Figure 4:
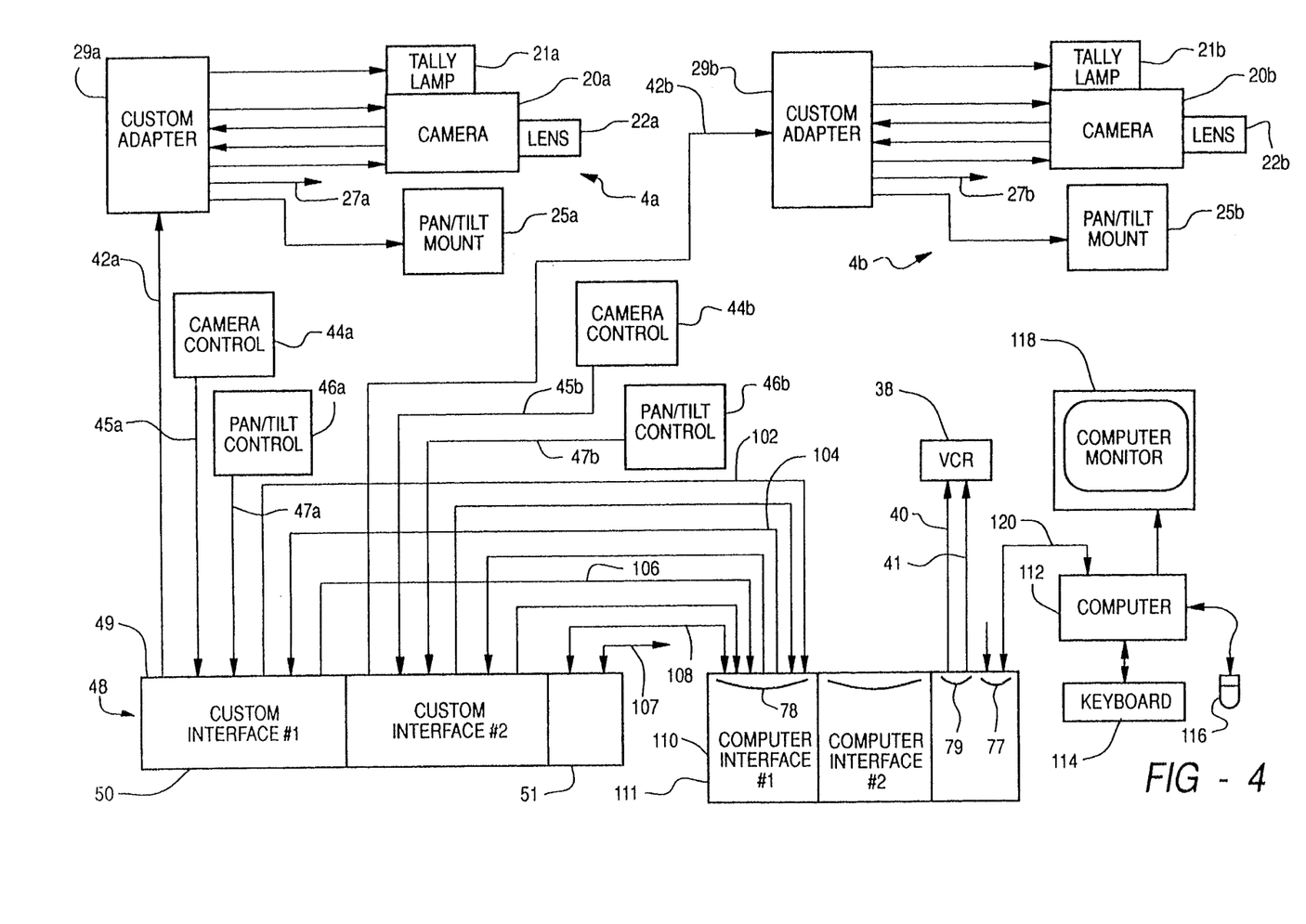
FIG. 4 is a block diagram of an alternative embodiment of the invention in a two-camera system utilizing a personal computer as part of a full multimedia video production system.

The performance of the system is increased significantly when the computer interfacing capabilities are implemented. FIG. 4 shows the various components of the integrated computer-based multimedia video production system. The system shares the equipment comprising the basic system previously described, from the cameras through the custom interfaces. However, the equipment comprising the video monitoring, video switching, and audio mixing capabilities is replaced with improved facilities provided by PC-computer equipment. An equipment chassis 110 is provided to house the various printed-circuit boards comprising the multimedia video production system. The chassis includes capabilities for integrating the signals provided by custom interface unit 48 to the PC-based signal processing equipment and its controlling software, implemented by computer 112. In an alternative embodiment, the facilities of the chassis 110 may be implemented internally by the computer, if it has sufficient space to accommodate the necessary printed circuit boards.

In the preferred computer-controlled embodiment, an interfacing cable 120 connects the computer 112 to the computer interfaces 111, by way of connectors 77. The details of the internal circuitry of the computer interfaces are described in detail in reference to FIG. 5, where it will be noted that the internal circuitry essentially duplicates the capabilities of the video switcher 34 and the audio mixer 36. As before, the audio and video output signals are carried by cables 40 and 41, respectively, to the master record VCR 38. However, instead of separate video monitors 32, the various video signals are displayed in "windows" on the computer monitor 118, and instead of separate controls on the audio mixer and video switcher, there are graphically based controls visible in "windows" on the computer monitor screen, adjustable via data entry through the keyboard 114 or the "mouse" 116. The camera controls and pan/tilt mount controls 44 and 46, respectively, may be duplicated via "windows" on the computer monitor screen, thereby eliminating the need for these separate controls. The functionality of each of these features by way of the computer monitor screens is explained with reference to FIG. 6. While FIG. 4 shows the overall system configuration for two-camera operation, it may be expanded to accommodate two additional cameras by adding a second computer interface module (not shown) and the associated camera and custom interface facilities.

Figure 5:
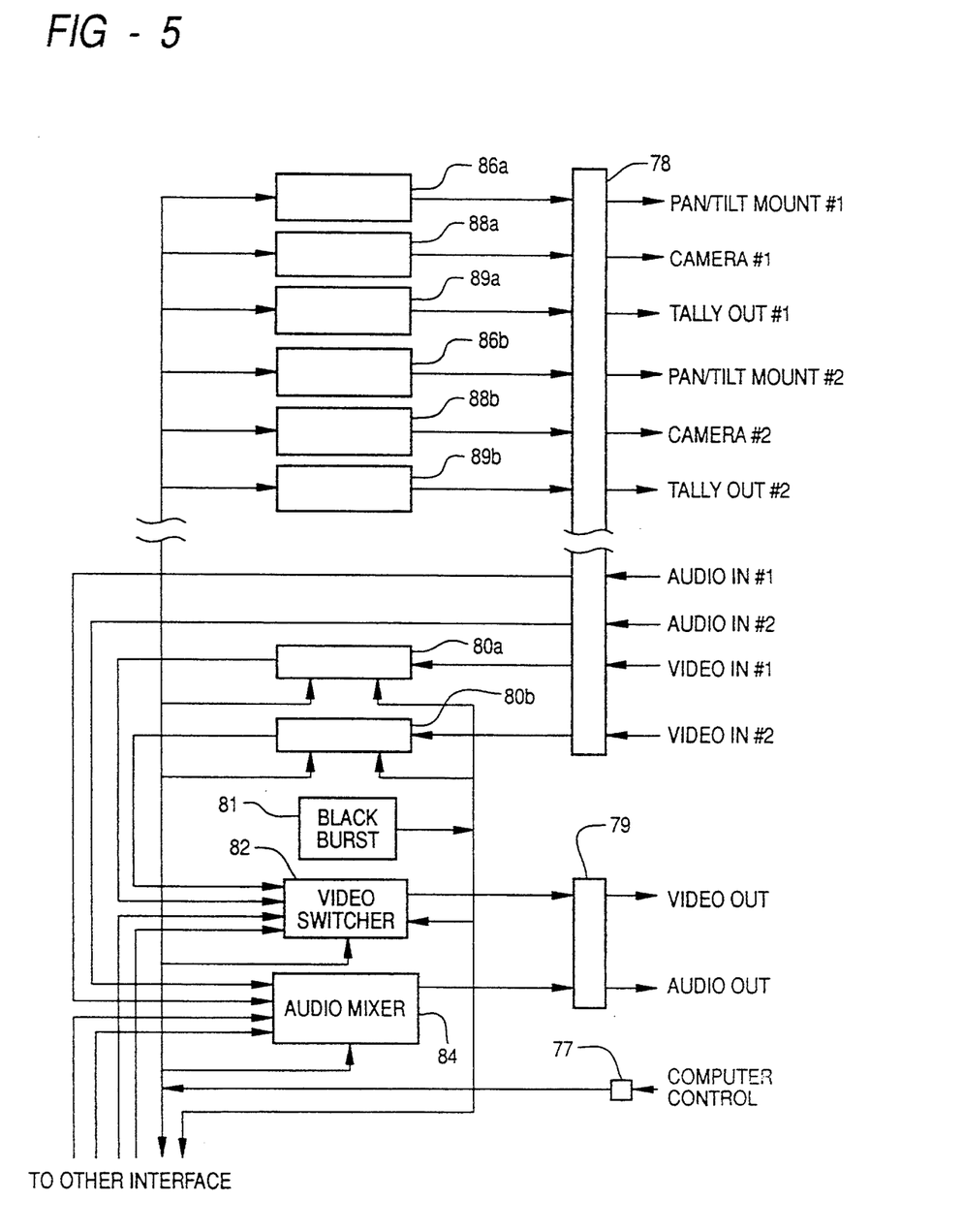
FIG. 5 is a schematic diagram of the internal circuitry of the computer interface modules.

The internal circuitry of the computer interface unit is shown in detail in FIG. 5. Each of the video input signals from a two-camera custom interface is connected to a combination time base corrector (TBC) and frame store 80, through multicontact connectors 78. The purpose of the TBC/Frame Store is to synchronize the cameras to enable their video signals to be switched and mixed by the video switcher; this also enables the playback of the camera VCR (camcorder) signals to be stabilized for this same purpose when these signals are used in post-production applications of the multimedia video production system. The overall video synchronization is driven by the video black burst generator 81, which connects to both TBC/frame stores in each interface 111, and also the computer controlled video switcher 82 provided in the computer interface frame 110. Audio signals from each of the sources is routed through connectors 78 to the audio mixer 84. The processed audio and video output signals are supplied to the multicontact connector 79, which is then connected to the master record VCR 38 through cables 40 and 41. Tally-out signals 89 for the two camera sources (typically a digital "high" signal or "low" signal) are supplied through connector 78 under computer control; in some commercially available implementations of the video switcher, the tally signals may be generated by the video switcher itself. In a similar manner, the interface generates the necessary serial-data signals for pan/tilt mount controls 86 and camera controls 88; in the case of post-production applications, the VCR playback is controlled through the associated camera remote control. Signals for the control of the camera and pan/tilt mount are provided through custom interface connector 64; the audio, video, and tally signals are split out separately to feed the appropriate individual connectors provided on the custom interfaces. Each of the circuits in the interface is under control of the external computer 112, by way of multicontact connector 77. Specialized software is designed to provide the capabilities needed to control each of these interfaces and their associated circuitry.

Figure 6:
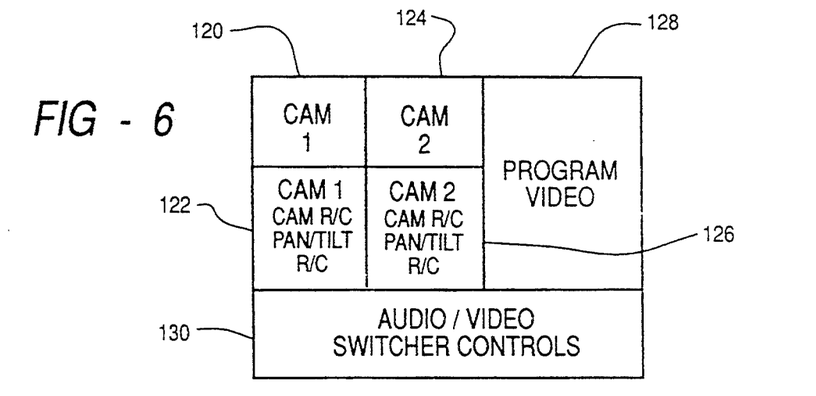
FIG. 6 is a drawing of a screen display typical of a two-camera system taking advantage of multimedia video productions.

FIG. 6 shows one of many possible configurations for the computer monitor display screen. in each case, the indicated areas are implemented as "windows" controlled by custom software, built on an industry-standard graphical-user-interface such as "Windows" by Microsoft Corporation; many alternative interfaces are commercially available. The area generally indicated 120 contains a window displaying the video signal from camera 1 (or camcorder 1 for post-production); the area 124 depicts the video associated with camera 2 (or camcorder 2). Operational controls for the camera and pan/tilt mount for each of these two sources are provided in windows 122 and 126, respectively. The audio mixer and video switcher facilities are operated by controls displayed in windows in the area 130, and the output of the video switcher is shown as "program video" in a window at the area indicated as 128.

Figure 7:
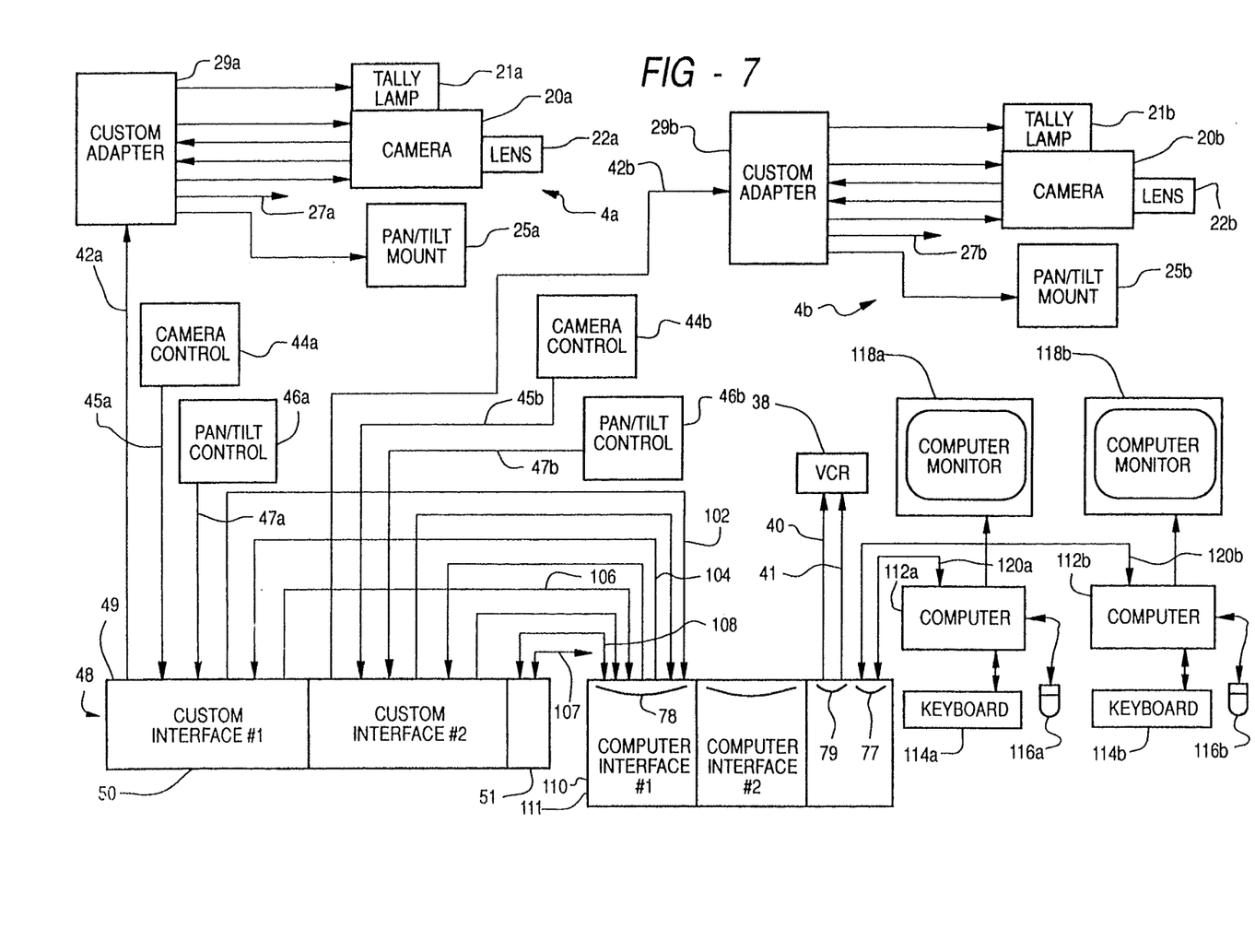
FIG. 7 is a block diagram of a full multimedia video production system utilizing four cameras.
Figure 8A:
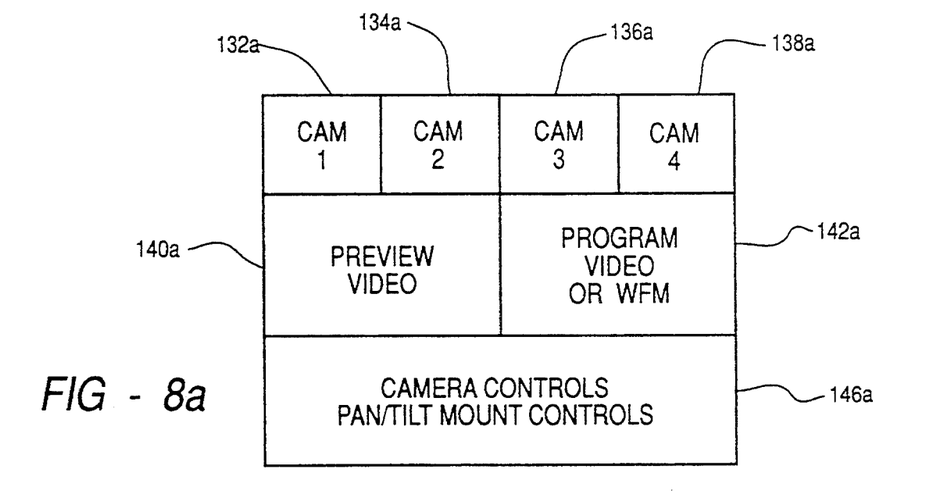
FIGS. 8A and 8B diagrammatically depict screen displays for a video engineer and director utilizing the four-camera multimedia system.
Figure 8B:
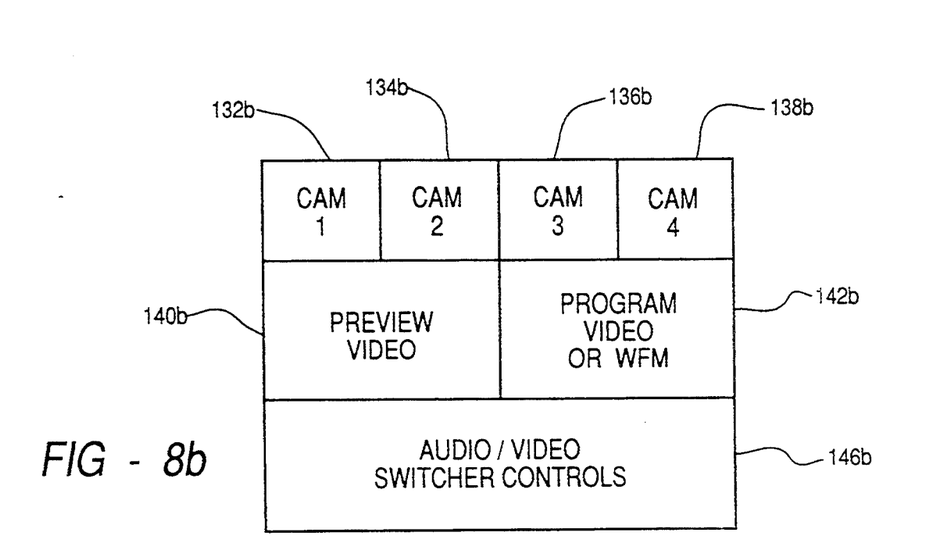

The implementation of a four-camera system is depicted in FIG. 7. Here, a second computer interface module has been provided, and an optional second computer is indicated 112b. Since the expansion of the electronic hardware capabilities is clear, only the functional differences will be explained, with reference to FIG. 8. Although separate computer display screens are shown as 8a and 8b, it is possible to implement both screens on a single computer. The display screen in FIG. 8a is traditionally assigned as the "video engineer" position, and the display screen in FIG. 8b is traditionally assigned as the "director" position; however, these functions both could be performed by a single experienced operator switching between the two display screens. Furthermore, it is possible to have a single experienced operator control even a four-camera production during taping, and then use the system to control the camcorders in playback to perform editing operations in post-production.

In the case of the separated functions of FIG. 8, the outputs of up to four cameras are shown in the windows denoted 132, 134, 136, and 138. "Preview video" from the video switcher is shown as windows 140, and "program video" is shown as windows 142. As an added feature, the window 142 can serve as a display for the video signals needed in the set-up of the system and for monitoring during the course of operation; this function is normally performed by specialized test instruments referred to as "waveform monitors" (WFMs). The various camera and pan/tilt mount controls are provided in the window area as 146, and the audio mixer and video switcher controls are provided in the window area designated as 148.

I claim:

1. A video production control system adapted for use in conjunction with equipment of a variety of designs, including video switchers, audio mixers, video display means, motorized pan/tilt camera mounts, including remotely controlled mounts, and video cameras, including remotely controlled cameras and cameras that include a video tape unit, the control system comprising:

a mounting frame;

a power supply disposed on the frame;

an adapter unit associated with each camera to be used with the system, including different camera models and cameras provided by different manufacturers, each adapter unit providing an operative electrical and mechanical interface to its associated camera;

a cable associated with each adapter unit; and a plurality of camera interface modules disposed on the frame, each module being connected to the power supply, video switcher, audio mixer and one adapter unit through its associated cable, each module being operative to:

route power and control signals to the camera and pan/tilt mount through the cable and adapter unit; and receive an unmodulated video signal from the camera through the adapter and cable, adjust for frequency compensation and gain of the unmodulated signal in accordance with an operator control, and route the adjusted video signal to the video display means and video switcher.

2. The video production control system of claim 1 wherein each interface module further includes a tally lamp connected to a separate tally-in signal from the video switcher, each module further providing a tally-out signal to the camera through the adapter, the lamp being illuminated and the tally-out signal being asserted when the camera associated with said interface module has been selected by an operator.

3. The video production control system of claim 1 wherein each camera interface module may include a remote-control receiver adapted to receive a wireless remote-control signal associated with a camera or a pan/tilt mount, the receiver being operative to convert the wireless signal into an electrical signal and route the electrical signal to the associated camera or pan/tilt mount through the cable and adapter.

4. The video production control system of claim 3 wherein the means to interface the electrical signal to the associated camera or pan/tilt mount includes a wireless remote-control transmitter operative to receive the electrical signal and to generate a wireless remote-control signal to be received only by its associated camera or pan/tilt mount.

5. The video production control system of claim 1 further including a computer interface adapted for use with a personal computer and a computer monitor, the computer interface being connected between a camera interface module and the personal computer, the computer interface being operative to receive signals from the computer to control each camera and pan/tilt mount through its associated camera interface module and adapter, and to route video signals and status information from the camera interface modules, video switcher and audio mixer to the computer to be displayed on the computer monitor.

6. The video production control system of claim 5 wherein the computer interface module includes a synchronization generator, time-base correction and frame-storage circuitry operative to synchronize the video signals received from each camera interface module and deliver the synchronized video signals to the video switcher.

7. The video production control system of claim 6 wherein the personal computer includes windowing software operative to display a video image in its own area of the monitor screen.

8. The video production control system of claim 7 wherein the software further includes an interface which allows an operator to manipulate icons related to the control of the system on the screen of the monitor.

9. The video production control system of claim 6 wherein the software further includes an interface to an input device which allows an operator to manipulate icons related to the control of the system on the screen of the monitor.

10. A personal-computer based video production control system adapted for use in conjunction with equipment supplied by various manufacturers including video cameras and programmed computers with monitors, the control system comprising:

an adapter unit interfaced to each camera to be used with the system including different models and cameras provided by different manufacturers, each adapter unit providing an operative electrical and mechanical interface to its associated camera;

a cable connecting each adapter unit to a separate camera interface module containing cable compensation and amplification circuitry; and a computer interface module connected between each camera interface module and the programmed computer, whereby video images generated by the cameras appear in different windows on the computer monitor, and control signals entered at the computer are routed to the cameras to control their functioning.

11. The multimedia video production control system of claim 10 wherein each computer interface module further includes time-base-correction and frame-storage circuitry feeding a video switcher common to all interface modules, the output video image generated by the switcher also being routed to the computer to appear in a separate window on the monitor.

* * * * *